United States Patent Office 3,171,803
Patented Mar. 2, 1965

3,171,803
PROCESS FOR REMOVING HARDNESS
FROM WATER
Archie H. Rice and Walter R. Conley, Corvallis, Oreg.,
assignors to General Services Company, a corporation
of Oregon
Filed Aug. 13, 1963, Ser. No. 301,818
9 Claims. (Cl. 210—52)

The present invention relates to a process for removal of hardness from water.

Hardness in water primarily in the form of calcium and magnesium values is objectionable for many water uses. For this reason, very hard water is usually softened by removal of all or part of these values. According to processes developed heretofore the softening chemicals are added to the water, the water is next passed to a contact chamber or settling basin to allow the softening reaction to take place and precipitates to settle out, and the water thereafter passed through a rapid sand type filter for final clarification. The capital investment required for such plants is substantial and the equipment required is also of substantial size.

It is, therefore, an object of the present invention to provide an improved process for the removal of hardness from water enabling the use of inexpensive equipment.

Another object of the invention is to reduce the size of the required equipment for removal of hardness from water.

A further object of the invention is to soften and clarify water at the same time with a minimum of equipment and maximum efficiency.

Still another object is to provide a new and improved means for removing sludges formed as a result of chemical reactions in the removal of hardness from water.

Other objects and advantages will become apparent from the following description of the invention.

The present invention resides in the discovery that hardness values (calcium and magnesium) can be removed from water by use of the usual chemicals but without the usual settling time. This is accomplished by thorough mixing of the usual chemicals (calcium hydroxide and sodium carbonate) with the hard water followed by addition of a coagulant such as aluminum sulfate, ferric sulfate, or activated silica, and thereafter substantially immediately passing the treated water through a filter or separation bed composed of granular materials of different density and size so that flow is in the direction of an increasing number of filter media particles per unit volume of filter media. Preferably a filter aid is added immediately prior to passing the water to the separation bed. A settling basin or contact vessel is thus eliminated and because of the greater flow and filtering capacity of such filters less surface area is required than with the rapid sand type filter.

The invention will be further described in detail and illustrated in the accompanying drawings wherein.

Figure 1:
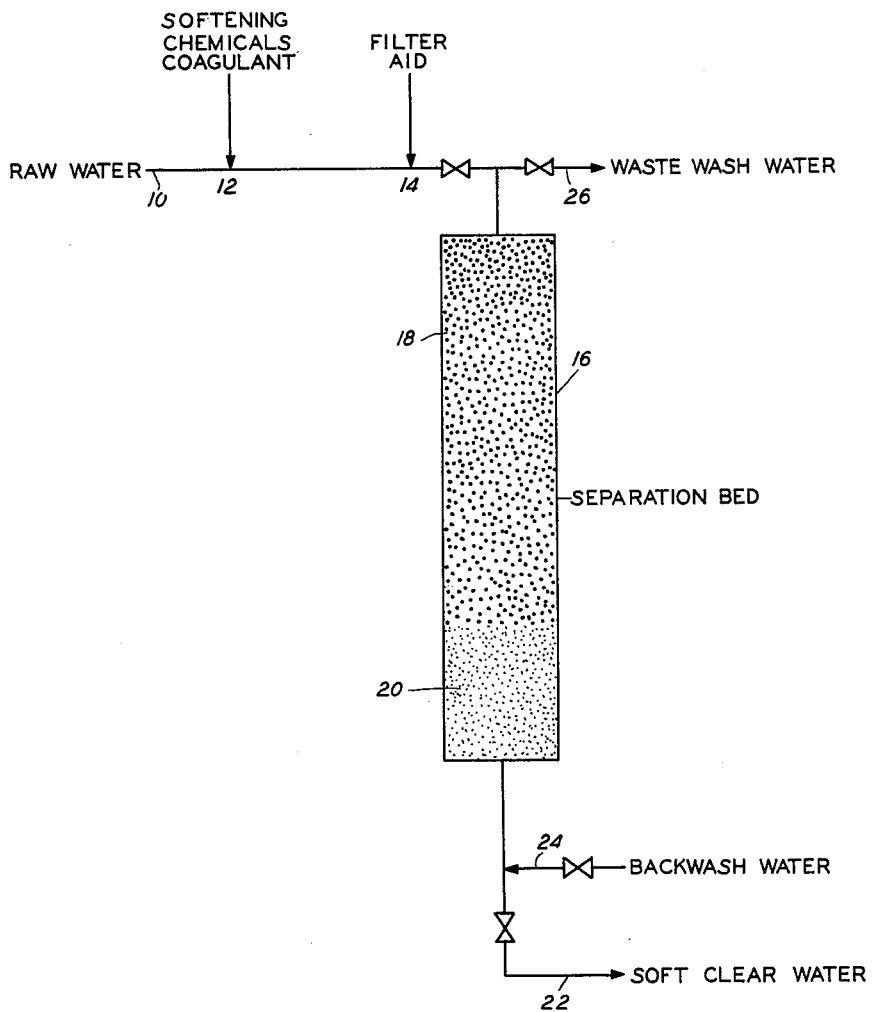
FIG. 1 is a flow diagram illustrating the application of our process to treatment of water.

For the purpose of this application, the following items are defined as follows:

(1) *Coagulant.*—An inorganic flocculant capable of producing a floc when added to water such as activated silica, ferric sulfate, ferrous sulfate, ferric chloride or aluminum sulfate.

(2) *Filter aid.*—A material when added to water capable of improving the filtering action when the water is passed through a separation bed of the type described hereinafter. Filter aids as used herein comprise polyelectrolytes, that is, compounds containing recurring units of small molecular weight chemically combined to form a molecule of large size. These compounds are generally organic polymers having recurring ionizable groups and are characterized by an inert carbon skeleton with attached large numbers of water compatible groups such as hydroxyl, amine, amide, or carboxyl. Included in this class of compounds are polysaccharides, polyacrylamides, and acrylamide polymer hydrolytes. Other suitable compounds include carboxymethyl cellulose, guar gum, alginates, and activated silica. Because these compounds have the characteristics of both polymers and electrolytes, they are called polymeric electrolytes or polyelectrolytes; based on the electrical charge that they carry they are classed as anionic, cationic, or non-ionic.

An effective polymer is one sold under the trademark Separan NP-10, by the Dow Chemical Company. This material is reported to have a molecular weight of approximately one million and is represented by the formula:

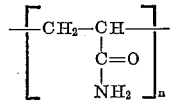

Separan NP-10 is formed by the polymerization of acrylamide. Because of the preponderance of amide groups, the polyacrylamide is essentially nonionic in solution although a small amount of the amide groups are usually hydrolized to anionic carboxyl groupings. It is a white, free flowing, amorphous solid with a bulk density of 0.55 gram per cubic centimeter. It softens at 220–230° C. It is rapidly wetted by water and is soluble in water in all proportions.

Other suitable polyectrolytes include Nalco 110, manufactured by the Nalco Company and Separan AP-30, a product of Dow Chemical Company.

Treatment in accordance with our process is as follows:

(1) Add calcium hydroxide or sodium hydroxide (and sodium carbonate if necessary) to the raw water in sufficient amount to react with the calcium and magnesium compounds to be removed from the water. Determine the amount of chemicals to be used by the usual and standard titration methods.

(2) Add only enough coagulant (under some conditions the magnesium in the water will act as the required coagulant) to produce a floc which can be removed by the separation beds.

(3) Add a filter aid to the water and substantially immediately thereafter, i.e., within a few minutes, pass the water through a separation bed arranged as described above.

The amount and kind of coagulant required depends on the kind of raw water being treated and the desired amount of softening to be achieved. The following general rules apply:

(A) Clear or turbid raw water containing very little magnesium, i.e., below 25 p.p.m., should be coagulated with activated silica, ferric sulfate, ferrous sulfate, ferric chloride, or aluminum sulfate in order of preference from first to last. The amount of activated silica to be added in this instance ordinarily will be from 1 to 10 p.p.m. with between about 1 to 4 p.p.m. preferred in most instances. Greater amounts of the iron containing coagulants ordinarily will be required. For example, between about 5 to 100 p.p.m. ferric sulfate will ordinarily be required, the preferred range being from about 10 to 40 p.p.m. In the case of aluminum sulfate, between about 5 to 200 p.p.m. may be utilized with the preferred range being from about 30 to 100 p.p.m. Unless otherwise indicated all amounts of materials, including the foregoing, specified herein are based on ratio of weight of material to weight of water being treated.

(B) Clear or slightly turbid raw water containing up to about 20 p.p.m. turbidity and over 50 p.p.m. magnesium, in addition to calcium will not ordinarily need a coagulant other than the magnesium from the water. If an additional coagulant is required, the materials listed in paragraph A may be used and in the same order of preference. If the turbidity of the water is such that the magnesium present will not provide sufficient coagulant, 1 to 10 p.p.m. activated silica may be added, 1 to 4 p.p.m. being the preferred range. If ferric sulfate is utilized from 1 to 60 p.p.m. may be used, with the preferred amount ranging from 2 to 20 p.p.m. From 1 to 60 p.p.m. alum may be used, the preferred range being from 2 to 10 p.p.m.

(C) Very turbid raw water containing over 20 p.p.m. turbidity ordinarily will require one of the coagulants listed in paragraph A in addition to the magnesium present. With very turbid waters the coagulant dosage will be primarily dependent upon the amount of turbidity and tests on a water will be necessary to determine the optimum amount of coagulant.

The amount of filter aid to be added will vary depending on the water being treated and the particular filter aid. Using Separan NP–10 the operative amount will range up to about 1.0 p.p.m., the preferred amount usually being between about 0.1 to 0.5 p.p.m. Activated silica when used as a filter aid may be added in amounts up to 4.0 p.p.m., the preferred range being between about 2.0 to 4.0 p.p.m.

In practice the amounts of coagulant and filter aid to use may be determined by adding an excess of filter aid (over 1.0 p.p.m. Separan NP–10, for example) to the water to which the softening chemical has been added and adjusting the coagulant dosage so as to obtain the desired water clarity upon passage through the separation bed. Then maintaining the coagulant dosage constant the filter aid dosage is decreased to the minimum which will produce clarified water.

The softening chemicals, coagulants and filter aids are all preferably added in the form of aqueous solutions so as to facilitate mixing with the water being treated.

The amount of softening chemicals to be added is determined in the conventional manner. Enough lime is added to convert any bicarbonates and dissolved carbon dioxide to carbonates and to convert any magnesium values to the hydroxide. An excess of up to about 100 p.p.m. of lime may be used to increase the amount of softening. Thereafter sufficient sodium carbonate is added to react with the so-called permanent hardness values present. Again an excess of up ot 100 p.p.m. may be added. Sodium hydroxide may be substituted for the lime. After treatment the water will range in pH from 9.0 to 12.0, the usual range being from 9.5 to 11.0.

The separation beds utilized in the invention preferably comprise a relatively deep layer of coarse material ranging between about −8 to +20 U.S. Standard Sieve size and one or more shallower layers of finer material ranging from about −20 to +60 U.S. Standard Sieve size. A preferred coarse material comprises crushed anthracite coal having a density of between about 1.5 and 1.6 and grading between about −10+20 mesh. As fine material silica sand having a density between about 2.6 and 2.7 and ranging between about −30+40 mesh is preferred. The depth of the coarse material may range from about 10 to 24 inches, the fine material from about 3 to 20 inches. A preferred arrangement comprises about 23 inches of −10+20 coal and about 7 inches of −30+40 sand. The coarse layer is preferably of lesser density than the fine layer so that upon back washing the bed will automatically regrade itself into the layers of different density and each layer will of course, regrade itself by size so that the larger particles will be on the top of a layer and the smaller on the bottom thereof.

In some instances a three layer bed may be desirable wherein the middle layer is of an intermediate density and size. For example, it may comprise −20+30 sand having a density of between about 2.45 and 2.55.

The separation beds can be operated successfully at flow rates of up to 10 g.p.m. per square foot. However, for most situations, the optimum rate will be between 4 and 8 g.p.m. per square foot.

The invention will now be described with reference to the drawings referring first to FIG. 1. The hard water to be treated is introduced through the line 10. Lime or sodium hydroxide, sodium carbonate and a coagulant are added at point 12. A filter aid is added at point 14. The treated water is then immediately passed through the separation bed 16 comprising an upper layer 18 of coarse material and a lower layer 20 of fine, more dense materials. The calcium carbonate sludge formed as a result of the softening reaction and any turbidity will be removed in the separation bed. The softened and clarified water is conducted away through a conduit 22. The bed 20 may be cleaned by passing clarified water up through the bed through pipe 24 and out waste line 26. Where gross amounts of turbidity are encountered it may be desirable to pass the water to a settling basin after addition of the softening chemicals and flocculant. The filter aid preferably is not added until after settling and just prior to entrance of the water into the separation bed.

Figure 2:
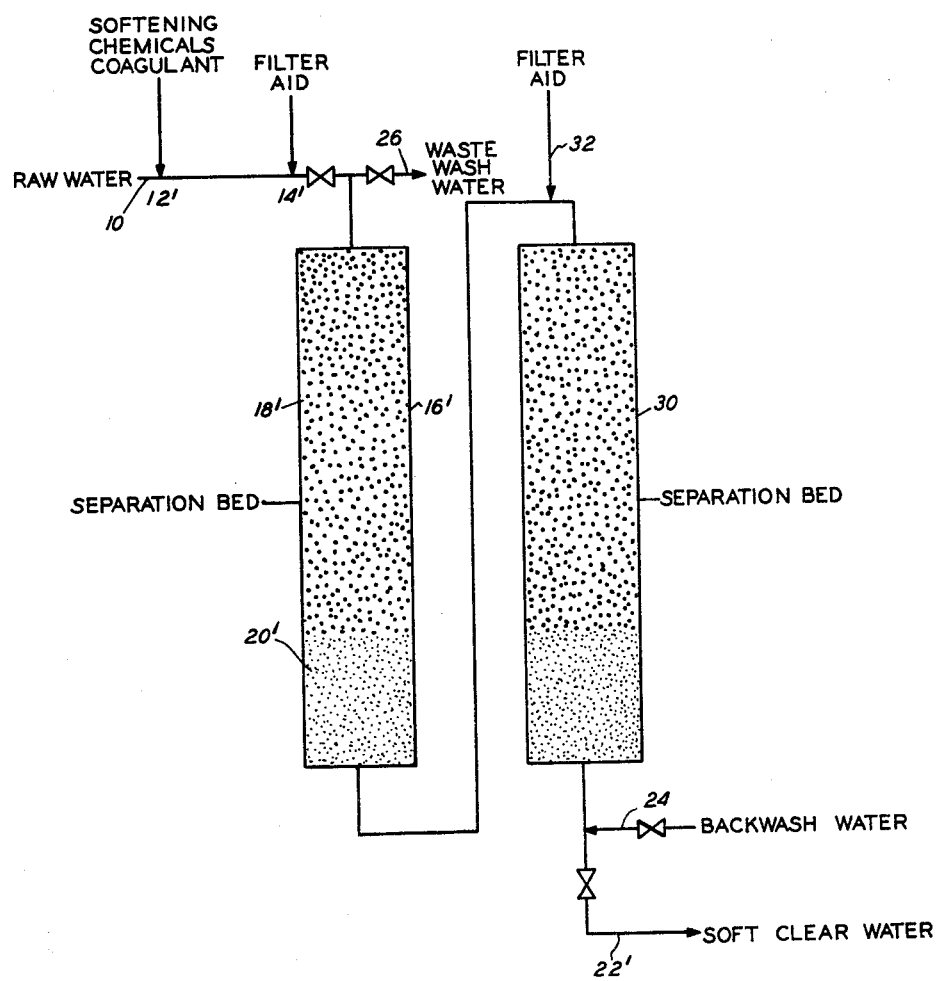
FIG. 2 is a modification of the flow diagram shown in FIG. 1.

To increase the capacity of a plant and particularly where excessive hardness or turbidity is present two or more separation beds may be placed in series. Thus, as shown in FIG. 2, a second separation bed 30 is placed in series with the initial separation bed 20'. Preferably additional filter aid is added at 32 between the beds 16', 30.

The following examples illustrate the application of the principle of the invention:

*Example I*

Water having approximately 387 p.p.m. permanent calcium hardness and a turbidity of 10 p.p.m. was treated by adding 120 p.p.m. alum, 610 p.p.m. sodium carbonate and 1.0 p.p.m. Separan NP–10. The water was then immediately passed through a separation bed having a top layer consisting of 23 inches of anthracite coal of −10+20 mesh size and a bottom layer consisting of 7 inches of silica sand of −30+40 mesh size. The effluent had a turbidity of about 0.4 p.p.m. and a hardness of 30 p.p.m. Flow of water through the separation bed was about 5 g.p.m. per square foot of surface.

*Example II*

Water having 387 p.p.m. permanent calcium hardness and a turbidity of 2 p.p.m. was treated by adding 4 p.p.m. activated silica, 0.2 p.p.m. Separan NP–10 and 435 p.p.m. sodium carbonate. The water was then immediately passed through a separation bed comprising 23 inches of −10+20 anthracite and 7 inches of −30+40 sand. The effluent had a turbidity of 0.4 p.p.m. and about 30 p.p.m. hardness. Flow rate through the separation bed was about 5 g.p.m. per square foot of surface.

*Example III*

Water containing magnesium values equivalent to 121 p.p.m. calcium carbonate and 2 p.p.m. turbidity was treated with 192 p.p.m. sodium carbonate and 181 p.p.m. lime and then passed through a separation bed comprising 23 inches of −10+20 anthracite and 7 inches of −30+40 sand at a flow rate of 5 g.p.m. per square foot. The turbidity of the effluent over a 10 hour run was between 0.15 and 0.4 p.p.m. and the total hardnes of the effluent varied between 75 and 130 p.p.m.

*Example IV*

Water containing magnesium values equivalent to 121 p.p.m. calcium carbonate and 2 p.p.m. turbidity was treated with 217 p.p.m. lime, 96 p.p.m. sodium carbonate, 2 p.p.m. ferric sulfate and 0.10 p.p.m. Separan NP–10 and then immediately passed through a separation bed comprising 23 inches of —10+20 anthracite and 7 inches of —30+40 sand at a flow rate of 5 g.p.m. per square foot. The effluent had a turbidity of 0.1 p.p.m., a total hardness of between about 75 to 130 p.p.m. and a calcium hardness of between about 45 to 60 p.p.m.

The removal of calcium carbonate sludge has always been a problem in the softening of water. The separation beds utilized in the process of the present invention successfully remove such sludges, and because of their ability to accept large amounts of coagulated material, runs of long duration may be made before the head loss on the bed renders it inefficient. The bed can then be restored simply by back-washing. The softening reactions are apparently catalyzed by the passage of the treated water through the separation bed so that the softening reaction is substantially completed and precipitation takes place while the water is in the bed to effect removal of the hardness values. Moreover, the separation bed effectively removes other turbidity imparting matter.

The improvement in a softening and clarifying process resulting from the use of separation beds of the nature described herein before is demonstrated by the results obtained in a modification of an existing process described below:

*Example V*

A softening plant was treating water having 180 p.p.m. hardness by adding 165 p.p.m. lime expressed as calcium oxide, 7 p.p.m. alum and 2 p.p.m. ferric sulphate. The water was then passed through an upflow clarifier and thence through a conventional fine sand filter at a maximum rate of 3 g.p.m. per square foot. The water passing from the clarifier had a turbidity of from 2 to 10 p.p.m. The filtered water had a hardness of 120 p.p.m. and a turbidity of from 0.2 to 0.5 p.p.m.

This process was revised by replacing the sand filter with a separation bed comprising an eight inch bottom layer of —30+40 sand and a 24 inch top layer of —10+20 coal. Immediately before the water was passed to the separation bed 0.01 to 0.1 p.p.m. Separan NP-10 was added thereto. The water was passed through the separation bed at a flow rate of 5.0 g.p.m. square foot and the filtered water had a turbidity of 0.1 to 0.2 p.p.m. Thus the capacity of the plant was increased by 160% and the quality of the water substantially improved at the same time.

Having illustrated and described the invention, it should be apparent to those skilled in the art that the invention permits of modification in arrangement and detail. We claim as our invention, all such modifications as come within the true spirit and scope of the appended claims.

We claim:

1. The method of removing calcium and magnesium hardness values and turbidity from water which comprises the step of adding a reactant to convert said values to insoluble calcium and magnesium compounds, adding an inorganic flocculant to said water and substantially immediately thereafter and without prior removal of resulting precipitates passing said water through a separation bed comprising particles grading from coarse to fine in the direction of flow, said coarse particles being between 8 to 20 mesh, said fine particles being less than about 30 mesh.

2. The process of claim 1 wherein sodium carbonate and lime are added to said water to convert said hardness values to insoluble calcium and magnesium compounds.

3. The process of claim 1 wherein said inorganic flocculant is selected from the class consisting of aluminum sulfate, ferric sulfate and activated silica.

4. The process of claim 1 wherein a filter aid is added to said water immediately prior to passing the same through said separation bed.

5. The process of claim 1 wherein a filter aid selected from the class consisting of polysaccharides, polyacrylamides, acrylamide polymer hydrolytes, carboxymethyl cellulose, guar gum, alginates and activated silica is added to said water immediately prior to passing said water to said separation bed.

6. The process of claim 1 wherein said separation bed comprises an upper layer of particles of between about —8+20 mesh and a lower layer of particles of between about —20+60 mesh.

7. The process of claim 6 wherein said upper layer is anthracite and said lower layer is silica sand.

8. The method of removing turbidity and calcium and magnesium hardness values from water which comprises the steps of adding reactants capable of converting said values to insoluble forms thereof,
   adding between about 1 to 200 p.p.m. of an inorganic flocculant to said water,
   adding between about 0.1 to 4.0 p.p.m. of a filter aid to said water,
   and thereafter substantially immediately passing said water through a separation bed comprising an upper layer of between 10 to 24 inches of anthracite having a particle size between —10+20 mesh and a lower layer of between 3 to 20 inches of sand having a particle size between —30+40 mesh.

9. The method of removing turbidity and calcium and magnesium hardness values from water which comprises the steps of adding reactants capable of converting said values to insoluble forms thereof,
   adding between about 1 to 60 p.p.m. ferric sulfate and between about 0.1 to 1.0 p.p.m. of an organic polymer having recurring ionizable groups,
   thereafter without prior removal of resulting precipitates passing said water through a separation bed comprising an upper layer of about twenty-three inches anthracite coal having a particle size of from —10+20 mesh and about seven inches of silica sand having a particle size of from —30+40 mesh.

References Cited by the Examiner

Klinger: Experience With Activated-Silica Treatment, J. AWWA, vol. 47, February 1955, pp. 175–185.

Symons: Water Softening, Part 2, The Lime-Soda Process, Water & Sewage Works, November 1957, pp. 496–502.

Conley et al.: Test Program for Filter Evaluation at Hanford, vol. 52, February 1960, pp. 205–218.

Conley: Experience With Anthracite-Sand Filters, J. AWWA, vol. 53, December 1961, pp. 1473–1483.

MORRIS O. WOLK, *Primary Examiner.*